(12) United States Patent
Trutschel et al.

(10) Patent No.: US 9,279,464 B2
(45) Date of Patent: Mar. 8, 2016

(54) ADAPTIVE METHOD FOR CONTROLLING CHARACTERISTICS OF A FRICTION CLUTCH ACTUATOR

(75) Inventors: Ralf Trutschel, Naumburg (DE); Thorsten Stepper, Waldenburg (DE); Andreas Pawlenka, Oehringern (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 0 days.

(21) Appl. No.: 13/080,553

(22) Filed: Apr. 5, 2011

(65) Prior Publication Data

US 2011/0246038 A1    Oct. 6, 2011

(30) Foreign Application Priority Data

Apr. 6, 2010   (DE) .......................... 10 2010 014 383

(51) Int. Cl.
*F16D 48/02* (2006.01)
*F16D 48/06* (2006.01)

(52) U.S. Cl.
CPC .............. *F16D 48/02* (2013.01); *F16D 48/066* (2013.01); *F16D 2048/0233* (2013.01); *F16D 2048/0269* (2013.01); *F16D 2500/1026* (2013.01); *F16D 2500/1045* (2013.01); *F16D 2500/10412* (2013.01); *F16D 2500/5018* (2013.01); *F16D 2500/70217* (2013.01); *F16D 2500/70223* (2013.01); *F16D 2500/70406* (2013.01); *F16D 2500/70615* (2013.01)

(58) Field of Classification Search
CPC .............................. F16D 48/02; F16D 48/066
USPC .................. 701/68; 477/34; 475/238, 269
See application file for complete search history.

(56) References Cited

U.S. PATENT DOCUMENTS

| | | | | |
|---|---|---|---|---|
| 3,848,620 | A * | 11/1974 | Fisher et al. | 137/116.3 |
| 6,656,087 | B1 * | 12/2003 | Runde et al. | 477/107 |
| 2004/0157704 | A1 * | 8/2004 | Stork et al. | 477/166 |
| 2005/0222734 | A1 * | 10/2005 | Akaike | 701/51 |
| 2006/0293147 | A1 * | 12/2006 | Adams et al. | 477/154 |
| 2009/0093989 | A1 * | 4/2009 | Moser et al. | 702/132 |
| 2009/0209392 | A1 * | 8/2009 | Stepper et al. | 477/174 |

FOREIGN PATENT DOCUMENTS

| | | |
|---|---|---|
| DE | 10 2005 052716 | 5/2007 |
| EP | 2 221 511 | 8/2010 |

OTHER PUBLICATIONS

Search Report dated May 20, 2011, for European Application No. EP 11 15 8756.

* cited by examiner

*Primary Examiner* — Yonel Beaulieu
*Assistant Examiner* — Basil T Jos
(74) *Attorney, Agent, or Firm* — Knobbe Martens Olson & Bear LLP

(57) ABSTRACT

A method for correcting an actuator characteristic of a clutch actuator for a friction clutch of a vehicle transmission after the commissioning of the vehicle. The actuator characteristic relates a first desired variable, such as a desired clutch pressure, to a second desired variable, such as an desired actuator current. The method includes approaching a quasi-steady-state operating point of the friction clutch. In addition, a deviation is detected between the first desired variable and an actual variable of the friction clutch. Also, a correction function is set up for the actuator characteristic according to the deviation.

9 Claims, 2 Drawing Sheets

ADAPTIVE METHOD FOR CONTROLLING CHARACTERISTICS OF A FRICTION CLUTCH ACTUATOR

CROSS-REFERENCE TO RELATED APPLICATIONS

This application claims the priority of German patent application DE 10 2010 014 383, filed Apr. 6, 2010.

BACKGROUND OF THE INVENTION

The present invention relates to a method for correcting an actuator characteristic of a clutch actuator for a friction clutch of a vehicle transmission.

Modern vehicle transmissions, such as automated manual transmissions, dual clutch transmissions and automatic torque converter transmissions, have friction clutches actuated in an automated manner. For example, dual clutch transmissions have two friction clutches, which are each assigned to a transmission section and can be actuated in an overlapping manner in order to be able to carry out a gear change without interrupting the traction. In this case, the friction clutches are actuated by respective clutch actuators, which can be designed as electric or hydraulic actuators.

The friction clutch is controlled, for example, via the clutch pressure. As a rule, however, the clutch actuator is activated via another variable, such as, for example, the electric current which is required for activating an electronic pressure control valve or an electromotive or electromagnetic actuator.

In the production of such vehicle transmissions, a vehicle-specific teach-in is carried out at the end, and this teach-in relates a first desired variable, such as a desired clutch pressure, to a second desired variable, such as a desired actuator current. In the process, the entire operating range is scanned step by step and then completed iteratively.

During operation, changes in the clutch actuator, for example changes in a hydraulic circuit for actuating the friction clutch, are estimated. However, this estimation is often inaccurate.

BRIEF SUMMARY OF THE INVENTION

Against this background, the object of the invention is to specify a method for correcting an actuator characteristic of a clutch actuator for a friction clutch of a vehicle transmission after the commissioning thereof.

This object is achieved by a method for correcting an actuator characteristic of a clutch actuator for a friction clutch of a vehicle transmission after the commissioning thereof, wherein the actuator characteristic relates a first desired variable, such as a desired clutch pressure, to a second desired variable, such as an desired actuator current, comprising the steps:

approaching a quasi-steady-state operating point of the friction clutch;
 detecting a deviation between the first desired variable and an actual variable of the friction clutch; and
 setting up a correction function for the actuator characteristic according to the deviation.

In the method according to the invention, after the commissioning of the vehicle, that is to say, for example, during maintenance work or also cyclically during normal operation, the actuator characteristic taught in beforehand is corrected.

The term "actuator characteristic" can be broadly understood in this case and is intended to include both simple characteristics and characteristic maps. Furthermore, the actuator characteristic can take into account hysteresis phenomena.

The actuator characteristic is corrected by a quasi-steady-state operating point of the friction clutch being approached. As stated, this can be done during maintenance work or also during normal operation.

As soon as the quasi-steady-state operating point is reached, a deviation between the first desired variable, such as, for example, a desired clutch pressure, and an actual variable of the friction clutch, such as, for example, an actual clutch pressure, is detected. Such a deviation may occur, for example, in the course of operation of the vehicle on account of aging phenomena of the clutch actuator.

The deviation is then used in order to set up a correction function for the actuator characteristic.

The actuator characteristic can therefore be corrected during operation. This results in a high static and dynamic operating accuracy of the open controlled system. As a result, the time which the closed controlled system requires for correcting maximum deviations is markedly reduced. In addition, the non-linear character of the superimposed pressure control is less pronounced, as a result of which the design and protection are simplified. The pressure controller can possibly be configured more aggressively than would be possible in the case of larger modulation ranges, e.g. for reasons of robustness. The result is higher dynamics and lighter control of the control dynamics, in particular in the adaptation zone.

The object is therefore completely achieved.

The first desired variable is preferably the controller output of a controller which controls the friction clutch on the basis of a control deviation between a higher-ranking desired value and an actual value. In this case, the control output is a type of corrected desired value which serves as input for the actuator characteristic.

The controller is preferably a pressure controller of a hydraulic clutch actuator, the control deviation of which is calculated on the basis of a difference between a higher-ranking desired pressure and an actual pressure. The actual pressure can be a pressure measured directly at the friction clutch or a value which is derived on the basis of other algorithms from other parameters of the clutch actuator.

Further embodiments of the correction method according to the invention are found in the dependent claims.

It goes without saying that the abovementioned features and the features still to be explained below can be used not only in the respectively specified combinations but rather also in other combinations or on their own without departing from the scope of the present invention.

BRIEF DESCRIPTION OF THE SEVERAL VIEWS OF THE DRAWING

Exemplary embodiments of the invention are shown in the drawing and are described in more detail below. In the drawing.

DETAILED DESCRIPTION OF THE INVENTION

Figure 1:
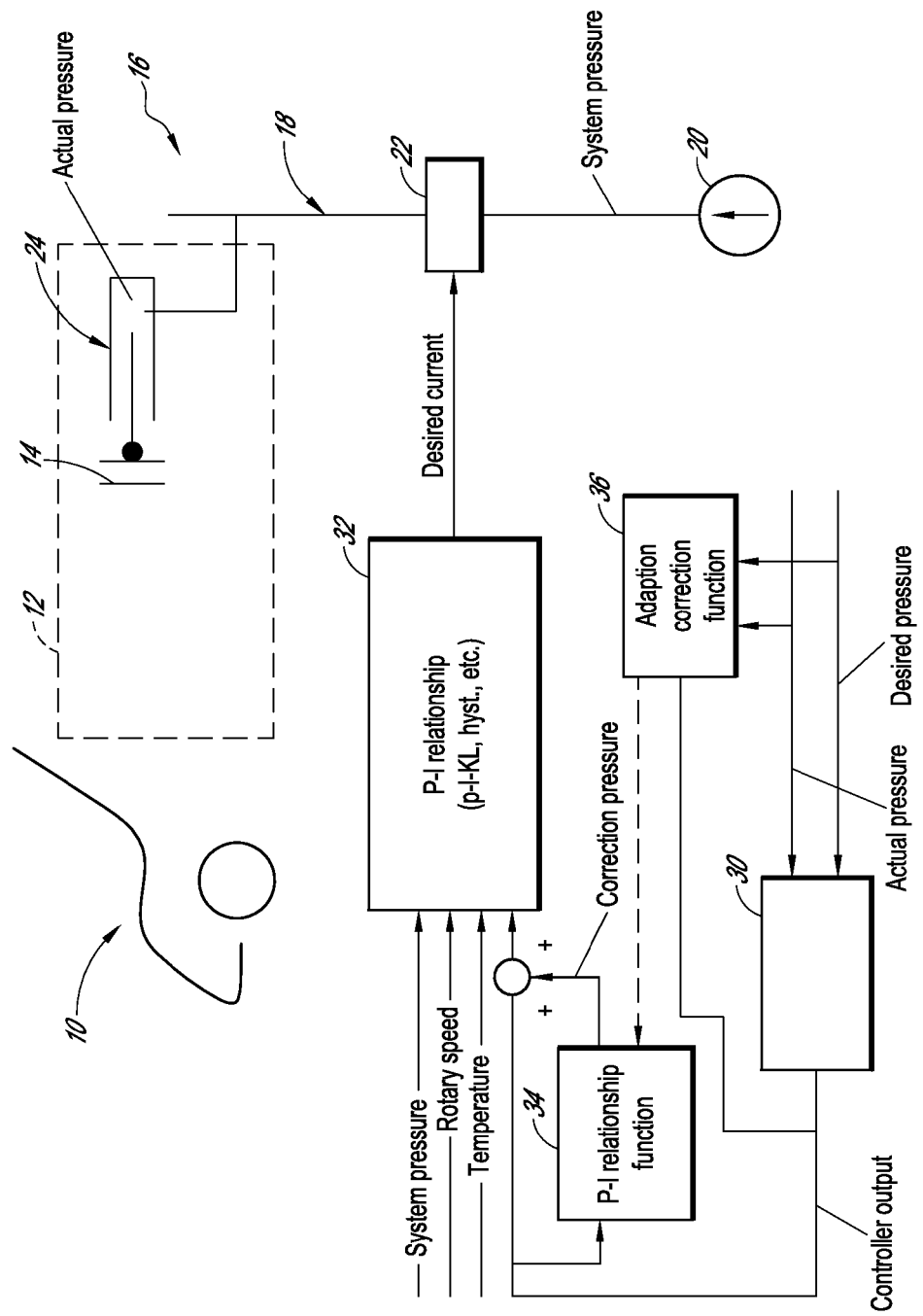
FIG. 1 shows a schematic illustration of a system for controlling a clutch pressure of a friction clutch of a vehicle transmission.

A vehicle, such as a passenger car, is designated schematically by 10 in FIG. 1. The vehicle 10 has a vehicle transmission 12 such as a dual clutch transmission. Furthermore, the vehicle transmission 12 contains at least one friction clutch 14, two parallel friction clutches 14 in the case of a dual clutch transmission, of which only one is shown.

A clutch actuator arrangement 16 serves for the automated actuation of the friction clutch 14. The clutch actuator arrangement 16 contains a hydraulic circuit 18 having a pump 20 for providing a system pressure and having a pressure control valve 22 which can be activated electronically and which generates an actual pressure for a hydraulic cylinder 24 for actuating the friction clutch 14.

A controller 30 serves for controlling the actual pressure. The controller 30 receives, as input, the actual pressure and a higher-ranking desired pressure, which is provided, for example, by a transmission control system.

The controller 30 can be any desired controller, for example a PI controller or the like. The output of the controller 30 is basically a type of controlled desired pressure which can be compensated by further measures. The controller output is input to an actuator characteristic 32 which produces a relationship between a first desired variable and a second desired variable, in the present case a relationship between the controlled desired pressure in the form of the controller output and a desired current which serves to activate the pressure control valve 22.

As a rule, the actuator characteristic 32 is taught in at the end of the production of the vehicle 10 in a vehicle-specific manner by, for example, the entire operating range being scanned step by step and by intermediate values then being determined iteratively.

It is shown in this case that the system pressure, a rotary speed of the friction clutch 14 and/or a temperature are/is also input into the actuator characteristic 32. These parameters can alternatively also be calculated beforehand for the compensation and added to or subtracted from the controller output.

Aging phenomena, for example of the hydraulic circuit 18 (wear of valves, leakages, etc.), occur in the course of the operation of the vehicle.

As a result, the actuator characteristic 32 may no longer be correct in the course of the operation of the vehicle.

In order to correct the actuator characteristic 32, a correction function 34 is provided, which generates a correcting pressure with reference to the controller output, and this correcting pressure is added to the controller output.

The correction function 34 is adapted in operation (that is to say during maintenance work or also cyclically), specifically by an adaptation routine 36. The adaptation routine 36 is called, for example, cyclically in order to determine the current correction demand. This is effected by a quasi-steady-state operating point of the friction clutch 14 being approached and by a deviation between the controller output and the actual pressure then being detected. This deviation then serves as a measure for setting up or adapting the correction function.

Figure 2:
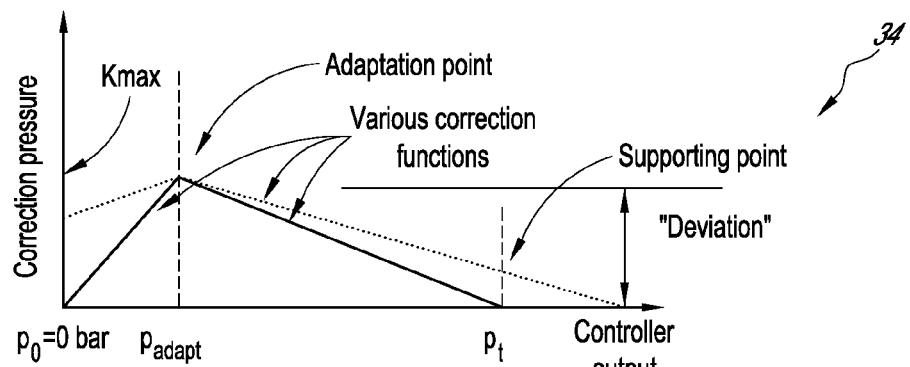
FIG. 2 shows an exemplary embodiment of a correction function.

FIG. 2 shows an exemplary illustration of a diagram of a correction function 34. In the correction function 34, a correction pressure is generated according to the controller output.

The function of the correction pressure has a maximum correction value Kmax, which the correction function has at a controller output value for which the correction function has been adapted, i.e. at $p_{adapt}$. Starting from this maximum correction value, the correction pressure decreases towards lower and higher values of the controller output. In other words, the correction measure is given a higher weighting at the adaptation point and a lower weighting at the working points lying further away therefrom. It can be seen that, at a controller output of 0 bar, the correction pressure is likewise 0. Furthermore, the correction pressure at a supporting point $p_1$ is likewise 0. However, the correction pressure at these points can also be more than 0.

Furthermore, it is possible to provide further correction values at other working points. In this case, more complex correction functions can be produced, which increase the accuracy within a larger value range.

The maximum correction value Kmax corresponds to a "deviation" which is determined by the adaptation routine 36.

Figure 3:
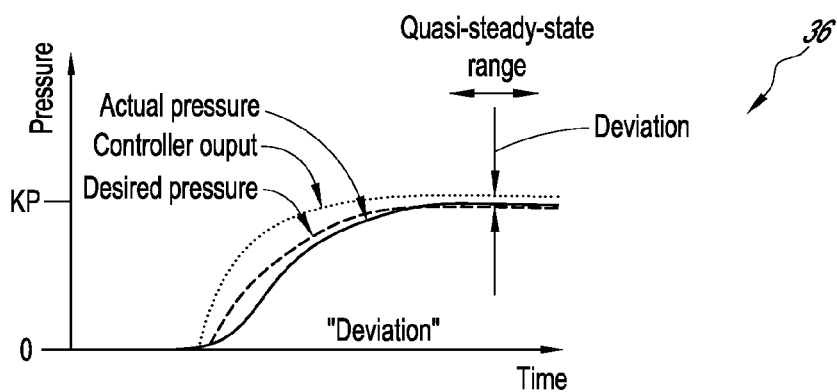
FIG. 3 shows a diagram of pressure plotted against time for illustrating an embodiment of an adaptation routine for setting up the correction function.
Figure 4:
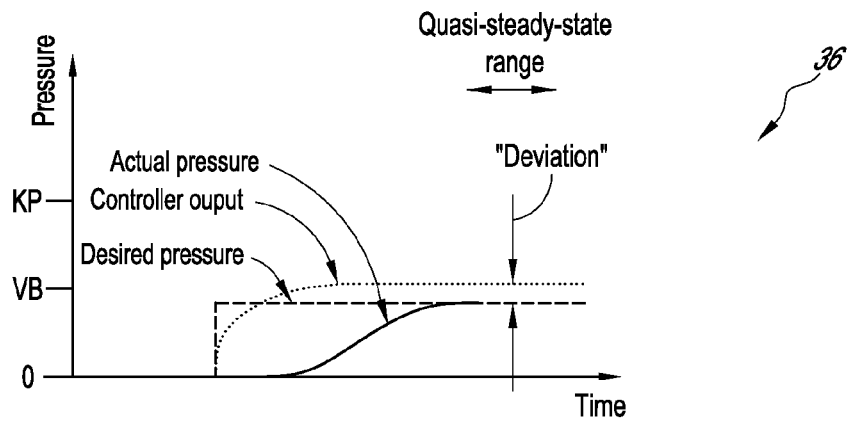
FIG. 4 shows a diagram of pressure plotted against time for illustrating an alternative embodiment of an adaptation routine for setting up the correction function.

FIGS. 3 and 4 show such adaptation routines 36, 36'.

In the adaptation routine 36 of FIG. 3, a quasi-steady-state operating point KP of the friction clutch is approached, this operating point KP corresponding to an engagement point of the friction clutch (=kiss point). In this case, the quasi-steady-state operating point is approached from an initial value in a monotonically increasing manner in order to avoid hysteresis problems. The initial value is preferably 0.

The quasi-steady-state operating point is preferably an operating point of the friction clutch at which there are high accuracy demands. This is, for example, the engagement point of the friction clutch.

As soon as the quasi-steady-state operating point is reached, the deviation between the controller output and the actual pressure of the friction clutch is determined. This deviation is used for adapting the correction function 34 and preferably corresponds to the maximum correction value Kmax.

Shown in FIG. 4 is an alternative adaptation routine 36', in which the quasi-steady-state operating point VB is approached, which corresponds to a preliminary filling of the clutch (i.e. a preparatory state). The pressure value VB is smaller than the pressure value KP. As in the case of FIG. 3, a deviation between the controller output and the actual pressure is determined for adapting the correction function 34.

In general, the following should be noted:

The deviation between a current actuator characteristic and a taught-in actuator characteristic is preferably determined as at the end of production ("End Of Line, EOL") at quasi-steady-state operating points. Such an operating point is preferably approached; however, a plurality of operating points may also be approached. The operating point should always be reached from below in a monotonically increasing manner in order to rule out corruption by hysteresis effects. Quasi-steady-state conditions exist when changes in the control variable pressure, that is to say the actual pressure, have lost virtually all dynamics over a certain period. The deviation determined in the adaptation routine 36 can be input directly as maximum correction value Kmax. Alternatively, it is possible to filter the shape of the deviation and compress it into an individual value, which is then used as maximum correction value Kmax.

Since the accuracy demands in the lower pressure range, in particular from the start of the torque transmission of the friction clutch, are highest, the deviation should be determined within this range. Suitable for this purpose is an adaptation operating point which lies precisely at the engagement point of the friction clutch or below this value. A suitable value below the engagement point is the "preliminary pressurizing" of the clutch, that is to say a state which exists anyway in the transmission control system and can be easily activated (as can the engagement point). The preliminary pressurizing corresponds to a state in which the clutch is virtually made ready but still does not transmit any torque.

The correction function is adapted according to the deviation. If the deviation is positive, the maximum correction value is increased; if the deviation is negative, the maximum correction value is reduced. It is appropriate to limit the step size in this case.

What is claimed is:

1. Method for correcting an actuator characteristic of a clutch actuator that actuates a friction clutch arrangement of a vehicle transmission, wherein the vehicle transmission is a dual clutch transmission and the friction clutch arrangement comprises a first friction clutch and a second friction clutch, wherein one of the first and second friction clutches is active and the other is inactive, wherein the actuator characteristic relates a first desired variable to a second desired variable, comprising the steps:

approaching a quasi-steady-state operating point of an inactive one of the first and second friction clutches of the friction clutch arrangement, wherein the quasi-steady-state operating point is the engagement point of the inactive one of the first and second friction clutches;

upon or after reaching the quasi-steady-state operating point, detecting a deviation between the first desired variable and an actual variable of the inactive one of the first friction clutch and second friction clutch of the friction clutch arrangement;

setting up a correction function for the actuator characteristic on the basis of the deviation;

correcting the actuator characteristic on the basis of the correction function to provide a corrected actuator characteristic; and actuating the friction clutch by means of the clutch actuator according to the corrected actuator characteristic;

wherein the method is carried out after the commissioning cyclically during operation in each case for the inactive friction clutch.

2. Method according to claim 1, wherein the quasi-steady-state operating point is approached from an initial value in a monotonically increasing manner.

3. Method according to claim 1, wherein the quasi-steady-state operating point corresponds to an operating point of the friction clutch arrangement having high accuracy demands.

4. Method according to claim 3, wherein the quasi-steady-state operating point corresponds to a value of the first desired variable at which the friction clutch arrangement has its engagement point, or corresponds to a lower value.

5. Method according to claim 4, wherein the friction clutch arrangement is put into a preparatory state at the lower value of the first desired variable.

6. Method according to claim 1, wherein the correction function is a function of a correction value according to the first desired variable, said correction value being added to the first desired variable.

7. Method according to claim 6, wherein the correction function has a maximum correction value at an adaptation value of the first desired variable, said correction value corresponding to the quasi-steady-state operating point.

8. Method according to claim 7, wherein the correction value for values of the first desired variable at least one of above or below the adaptation value is smaller than the maximum correction value.

9. Method according to claim 1, wherein the second desired variable is a desired actuator current for a pressure control valve of a hydraulic clutch actuator.

* * * * *